(12) United States Patent
Yim

(10) Patent No.: US 7,338,678 B2
(45) Date of Patent: Mar. 4, 2008

(54) COMPOSITION FOR TREATING GROUNDWATER CONTAMINATION

(75) Inventor: Chan S. Yim, Princeton Junction, NJ (US)

(73) Assignee: W.A. Cleary Corporation, Somerset, NJ (US)

( * ) Notice: Subject to any disclaimer, the term of this patent is extended or adjusted under 35 U.S.C. 154(b) by 275 days.

(21) Appl. No.: 11/115,429

(22) Filed: Apr. 27, 2005

(65) Prior Publication Data

US 2006/0243662 A1 Nov. 2, 2006

(51) Int. Cl.
*A23L 1/236* (2006.01)
(52) U.S. Cl. .................. 426/548; 426/580; 426/271
(58) Field of Classification Search ............... 426/548, 426/580, 271
See application file for complete search history.

(56) References Cited

U.S. PATENT DOCUMENTS

| | | | |
|---|---|---|---|
| 3,649,302 A * | 3/1972 | Daggy et al. | 426/271 |
| 4,011,349 A * | 3/1977 | Riesen | 426/548 |
| 5,789,649 A | 8/1998 | Batchelor et al. | |
| 6,264,399 B1 | 7/2001 | Grisso et al. | |
| 6,326,187 B1 | 12/2001 | Jones et al. | |
| 6,398,960 B1 | 6/2002 | Borden et al. | |
| 6,492,572 B2 | 12/2002 | Batchelor et al. | |
| 2002/0156337 A1 | 10/2002 | Jensen et al. | |
| 2003/0022946 A1 | 1/2003 | Bush et al. | |
| 2004/0157317 A1 | 8/2004 | Sorenson, Jr. et al. | |
| 2004/0247624 A1 * | 12/2004 | Unger et al. | 424/400 |
| 2006/0204632 A1 * | 9/2006 | Barrett-Reis et al. | 426/580 |

OTHER PUBLICATIONS

S.S. Koenigsberg, "*Hydrogen Release Compound (HRC®): A Novel Technology for the Bioremediation of Chlorinated Hydrocarbons*", Proceedings of the 1999 Conference on Hazardous Waste Research, May 1999, St. Louis, Missouri.

* cited by examiner

*Primary Examiner*—Chester T. Barry
(74) *Attorney, Agent, or Firm*—Norris, McLaughlin & Marcus

(57) ABSTRACT

A composition comprising phospholipid and surfactant for remediating water, such as groundwater, contaminated with halogenated organic compounds. The composition may further comprise a free iron source. The composition is used in a method for remediating contaminated water, such as groundwater, through bioremediation.

6 Claims, No Drawings

COMPOSITION FOR TREATING GROUNDWATER CONTAMINATION

BACKGROUND OF THE INVENTION

1. Field of the Invention

The invention pertains to a composition comprising phospholipid, surfactant and, optionally, iron compounds, for treating groundwater contamination. The invention further concerns a method for remediation of contaminated groundwater through bioremediation comprising the step of applying, at least, the composition to contaminated groundwater. The composition and method may be used for treating groundwater contaminated with halogenated organic compounds, such as chlorinated ethenes and methanes, as well as other types of contaminants.

2. The Related Art

Groundwater contamination can be remediated by physical means, such as the removal of contaminated groundwater from an aquifer followed by removal of contaminants, i.e. pump and treat methods. Other methods, such as in situ remediation techniques through chemical oxidation and bioremediation have also been developed.

Pump and treat methods generally involve installing one or more recovery wells to recover contaminated groundwater from an aquifer and then removing the contaminants with above ground treatment, such as by air stripping and/or activated carbon adsorption. The decontaminated water is then usually discharged to a surface water body, possibly after further treatment by a water treatment works. The in-situ methods discussed above (i.e. chemical oxidation and bioremediation) are considered cost effective remedial alternatives, particularly when conventional pump and treat methods are ineffective because a particular geological system has low permeability.

Chemical oxidation methods generally involve injecting chemicals into a contaminant plume in the groundwater which react with the contaminants to convert the contaminants into substances that are not harmful to the environment. Biological methods, such as bioremediation, involve the use of biological organisms to remediate the contaminants via a process generally referred to as biodegradation.

U.S. Pat. No. 6,398,960 concerns a method for the bioremediation of contaminated groundwater, which is said to remediate the groundwater using an innocuous of oil formulated into a microemulsion by mixing with one or more natural food-grade emulsifiers and water. Also, chlorinated solvents can be remediated through a method of bioremediation involving the use of polyacetate esters which release lactic acid that is metabolized by microorganisms to produce hydrogen ion. Remediation of contamination with zerovalent iron, such as nano iron, i.e. extremely fine nano scale ($10^{-9}$ meter) iron particles, is also discussed in the art.

New and more efficient technologies for remediation of water, such as groundwater, are constantly desired in the art. Moreover, remediation technologies efficient to particular classes or types of contaminants are also desired because the type and nature of contaminants in groundwater may differ depending on the nature of the activities conducted at industrial and commercial establishments at or near the groundwater contamination, and the nature of the toxic substances in the groundwater.

All parts and percentages in this specification and the claims are on a weight by weight basis unless otherwise specified.

SUMMARY OF THE INVENTION

The invention concerns a composition that can be used to remediate contaminated groundwater. The composition comprises phospholipid and surfactant. The composition may further comprise a free iron source and, optionally, acid.

The composition, in a mixture with water, can be applied to remediate contaminated groundwater, such as groundwater contaminated with halogenated organic compounds. Thus, the invention concerns a method for remediation of contaminated groundwater comprising the steps of forming a mixture of the composition with water, and, optionally, a free iron source and/or acid, and applying the mixture to a plume of contaminated groundwater. The phospholipid provides a carbon food source for the indigenous microorganisms existing in the subsurface environment of the groundwater. The mixture, particularly the phospholipid in the mixture, is metabolized by the indigenous microorganisms to generate hydrogen ions ($H^+$) which break down the contaminants in the groundwater via a natural process known as reductive dechlorination. Accordingly, the invention provides an effective means to remove contaminants from groundwater in situ in the aquifer.

DETAILED DESCRIPTION OF THE INVENTION

The composition generally comprises phospholipid and surfactant. The composition may further comprise a free iron source, which provides an iron compound to the composition and/or acid. The composition may comprise from about 60% to about 95% phospholipid and about 5% to about 40% surfactant, for example, about 85% to about 95% phospholipid and about 5% to about 15% surfactant, including a composition comprising about 90% phospholipid and about 10% surfactant.

Phospholipids useful in the invention include those selected from the group consisting of lecithin, phosphatidyldiglycerol, phosphatidylinositol, phosphatidylserine, phosphatidylethanolamine, and combinations thereof The phospholipids may be soy based, however, lecithins of animal origin, such as lecithin obtained from egg yolk (i.e. egg phospholipid) and lechithin obtained from butter milk may be used.

Generally recognized as safe (gras) surfactants may be used in the invention. For example, the surfactant may be selected from the group consisting of polysorbate, polyoxyethylene stearate, sorbitan fatty acid ester and combinations thereof. Polysorbates include polyoxyethylene (20) sorbitan monolaurate, polyoxyethylene (20) sorbitan monopalmitate, polyoxyethylene (20) sorbitan monostearate, polyoxyethylene (20) sorbitan tristearate and polyoxyethylene (20) sorbitan monoleate. Polyoxyethylene stearates include polyoxyethylene (8) stearate and hydrated polyoxyethylene (8) stearate. Sorbitan fatty esters include sorbitan mono-stearate and sorbitan tristearate. Polyoxyethylene (20) sorbitan monoleate is the preferred surfactant for the composition.

The composition may further comprise a free iron source, such as ferric chloride ($FeCl_3$), and optionally an acid, such as hydrochloric acid (HCl). For example, the composition may comprise ferric chloride in a dilute hydrochloric acid solution which comprises about 32% to about 45% ferric chloride, less than about 3% hydrochloric acid and about 52% to about 67% water. Ferric chloride solution, having specific gravity of about 1.432 at 17.5° C. may be used in the invention. When the composition comprises a free iron source, the composition generally comprises from about 30% to about 70% phospholipid, about 5% to about 10% surfactant and about 20% to about 65% of a free iron source, such as ferric chloride, like that in a solution having the composition discussed above, including a composition comprising about 30% to about 50% phospholipid, about 4% to about 20% surfactant, about 15% to about 30% ferric chloride, about 1% to about 2% hydrochloric acid and about 3% to about 40% water.

The free iron source may be ferric chloride powder or ferric sulfate which is added to the composition. In the preferred embodiment of the invention, however, the free iron source is liquid ferric chloride in dilute hydrochloric acid, as discussed above. The ferric iron ($Fe^{3+}$) donates an electron as it solubilizes to ferrous iron ($Fe^{2+}$) thereby acting as a reductant in the reaction and promotes removal of chlorine atoms from the chlorinated compounds.

The composition is useful for treating groundwater contamination, particularly groundwater contaminated with halogenated organic compounds, for example, chlorinated aliphatic compounds such as carbon tetrachloride ($CCl_4$), tetrachloroethene (PCE), trichloroethene (TCE), cis & trans-dichloroethene, vinyl chloride, 1,1,1-trichloroethene, 1,1- and 1,2-dichloroethene, chloroethene, chloroform, methylene chloride, chloromethane and the like. The composition is also useful for remediating groundwater contaminated with chlorinated aromatic compounds, including chlorinated benzenes, chlorinated phenols (e.g. pentachlorophenol) and chlorinated biphenyls (PCBs). Preferably, the method is used for remediating groundwater contaminated with carbon tetrachloride and its daughter product chloroform through reductive dechlorination. The method generally comprises combining the composition comprising phospholipid and surfactant (with optional free iron source and/or iron) and water to obtain a mixture and applying the mixture to contaminated water, such as contaminated groundwater. The phospholipid is metabolized by the indigenous microorganisms in the subsurface environment resulting in the generation of $H^+$ ions which chemically degrade the contaminant material into environmentally benign substances. For example, carbon tetrachloride will degrade to chloroform, then to dichloromethane, then to chloromethane, then to methane and elemental chlorine. When the composition is used with a free iron source, the chloroform degrades more rapidly than absent a free iron source. Also, unless there exists a substantial buffering capacity within the subsurface environment, the use of an acid component with the free iron source, i.e. ferric chloride in dilute hydrochloric acid solution, is believed to act synergistically with the free iron source in liberating additional hydrogen ions that trigger the reductive dechlorination process. When tetrachloroethene is a contaminant, the tetrachloroethene generally degrades to trichloroethene, then to eventually to vinyl chloride, ethene and elemental chlorine.

In one embodiment of the method, the mixture of the composition (with or without a free iron source and/or acid) and water generally comprises about 50% to about 95% water and about 5% to about 50% of the composition. For example, the mixture may comprise about 10% of the composition and about 90% water. The mixture may be in the form of an emulsion, such of an emulsion of the components of the composition, i.e. the phospholipid, surfactant and optional free iron source and/or acid, in water.

The method for remediating groundwater comprises the steps of providing the composition as described herein, mixing the composition with water, as discussed above, to obtain a mixture and then applying the mixture to contaminated groundwater to decrease the amount of contaminants, such as halogenated compounds, in the ground water. The amount of mixture required to remediate the groundwater depends on the magnitude of the contamination and the prevailing geochemical nature of the subsurface environment. Generally, however, the volume ratio of the mixture to contaminated groundwater is from about 1:50 to about 1:100, preferably about 1:50 to about 1:75.

The mixture may be applied to the contaminated groundwater at one or more application points by injection. For example, the mixture can be injected by using one or more direct push rigs, such as GEOPROBE® or conventional air-rotary drill rigs. The injection may occur with the application of pressure or under force of gravity depending on conditions. For example, a pressure gradient may be required for aquifers with relatively low hydraulic conductivity. In shallow aquifers, technologies such as infiltration galleries may be used to apply the mixture to the contaminated groundwater.

In an embodiment of the invention, a single application or a single application scheme may be applied to effectively remediate the groundwater to acceptable contaminant levels. An application or application scheme refers to an application event at one or more application points to load the mixture into the groundwater to obtain the appropriate volume ratios, such as a volume ratio of mixture to contaminated groundwater of about 1:50 to about 1:100, to achieve effective remediation. In certain embodiments of the invention, more than one application scheme will be necessary, depending on the magnitude of the contamination to maintain the appropriate volume ratio. It is recommended that the groundwater be monitored periodically, such as about every three months, after the initial application scheme, to ascertain an amount of halogenated organic compounds in the groundwater and determine if one or more further applications or additional application schemes will be necessary to further decrease the amount of halogenated compounds in the groundwater. In an embodiment of the invention, a single application scheme occurs at one or more application points, i.e., the mixture of composition and water is applied only once to the contaminant plume in the groundwater.

The determination of whether additional application schemes are necessary, e.g., one or more further applications of the mixture to the contaminated groundwater, is generally based on clean up criteria. For purposes of this specification and the claims, clean up criteria shall refer to site specific levels of contaminants that may remain in the groundwater as desired by the property owner or other person or entity, or may be site specific or general acceptable levels of contaminants in the groundwater imposed by a governmental entity regulating by the environment and/or a specific contaminated site, such as regulatory clean up standards, established by any national, federal, state or other governmental environmental regulatory authority.

The surfactant facilitates dispersion of the mixture in the groundwater, and also acts as an emulsifier in the mixture when it is in the form of an emulsion. In the method for remediation of groundwater, the phospholipid, which becomes dispersed in the groundwater, is, as discussed above, metabolized by the indigenous microorganisms in the subsurface environment, which synthesizes hydrogen ions that cause degradation of the contaminants by means of reductive dechlorination.

EXAMPLES

Example 1 (Comparative)

Approximately one gram of Nano Iron (from PARS Environmental, Inc., Robbinsville, N.J., USA) is added to 500 milliliters of groundwater containing carbon tetrachloride. The groundwater with Nano Iron is observed for 40 days, with analysis of groundwater for content of carbon tetrachloride, chloroform, dichloromethane and chloromethane conducted prior to incorporation of the Nano Iron (0 day) and at 5, 20 and 40 days of treatment. The analytical results reflected in parts of each compound per billion parts groundwater (parts per billion or ppb) are set forth in Table 1.

TABLE 1

| Compound | Time = 0 day | Time = 5 days | Time = 20 days | Time = 40 days |
|---|---|---|---|---|
| $CCl_4$ | 52,500 | 368 | 88.5 | 83 |
| Chloroform | 1,550 | 8,010 | 3,090 | 1,250 |
| Dichloromethane | 57.1 | <35 | 38.8 | 32.3 |
| Chloromethane | 9.76 | <55 | <27.5 | <27.5 |

Example 2

Thirty grams of a composition of 90% lecithin and 10% polyoxyethylene (20) sorbitan monoleate was combined with 250 grams of water to form a mixture comprising 10.7% of the composition and 89.3% water. Ten milliliters of this mixture was then added to 500 milliliters of groundwater containing carbon tetrachloride ($CCl_4$). The groundwater was observed for 40 days, with the analysis of the content of carbon tetrachloride, chloroform, dichloromethane and chloromethane conducted prior to adding the mixture (0 day) and at 5, 20 and 40 days of treatment. The analytical results reflected in parts per billion are set forth in Table 2.

TABLE 2

| Compound | Time = 0 day | Time = 5 days | Time = 20 days | Time = 40 days |
|---|---|---|---|---|
| $CCl_4$ | 52,500 | 9,100 | 710 | 291 |
| Chloroform | 1,550 | 2,480 | 2,490 | 1,340 |
| Dichloromethane | 57.1 | <35 | 25.5 | 26.8 |
| Chloromethane | 9.76 | <55 | <27.5 | <27.5 |

Example 3

The use of a free iron source in conjunction with a composition of 90% lecithin and 10% polyoxyethylene (20) sorbitan monoleate in treating groundwater contaminated with carbon tetrachloride was evaluated in this example. The free iron source was technical grade ferric chloride (iron (III) chloride solution) from Coyne Chemical, Croydon, Pa., USA. Information available from the manufacturer indicates that this technical grade ferric chloride has, on average, 32% to 45%, by weight of the iron (III) chloride solution, ferric chloride and less than 3%, by weight of the iron (III) chloride solution, hydrochloric acid with the balance being water.

Ten milliliters of a mixture comprising 77.4% water, 9.3% of the composition (90% lecithin and 10% polysorbate 80) and 13.3% of the technical grade ferric chloride from Coyne Chemical was added to 500 milliliters of groundwater containing carbon tetrachloride ($CCl_4$). The groundwater was observed for 40 days, with analysis of the content of carbon tetrachloride, chloroform, dichloromethane and chloromethane conducted prior to adding the mixture (0 day) and at 5, 20 and 40 days of treatment. The analytical results reflected in parts per billion are set forth in Table 3.

TABLE 3

| Compound | Time = 0 day | Time = 5 days | Time = 20 days | Time = 40 days |
|---|---|---|---|---|
| $CCl_4$ | 52,500 | 7,370 | 1,710 | 508 |
| Chloroform | 1,550 | 955 | 525 | 338 |
| Dichloromethane | 57.1 | <35 | <35 | 23.8 |
| Chloromethane | 9.76 | <55 | <55 | <27.5 |

What is claimed is:

1. A composition for remediating groundwater contaminated with halogenated organic compounds comprising from 30% to 70% phospholipid, 5% to 10% surfactant and 20% to 65% of a free iron source.

2. The composition of claim 1 wherein the free iron source is selected from the group consisting of ferric chloride and ferric sulfate.

3. The composition of claim 2 wherein the ferric chloride is in a solution with an acid.

4. The composition of claim 1 wherein the phospholipid is selected from the group consisting of lecithin, phosphatidyldiglycerol, phosphatidylinositol, phosphatidylserine, phosphatidylethanolamine and combinations thereof.

5. The composition of claim 1 wherein the surfactant is selected from the group consisting of polysorbate, polyoxyethylene stearate, sorbitan fatty acid ester and combinations thereof.

6. The composition of claim 5 wherein the polysorbate is selected from the group consisting of polyoxyethylene (20) sorbitan monolaurate, polyoxyethylene (20) sorbitan monopalmitate, polyoxyethylene (20) sorbitan monostearate, polyoxyethylene (20) sorbitan tristearate and polyoxyethylene (20) sorbitan monoleate.

* * * * *